No. 686,127. Patented Nov. 5, 1901.
J. B. POTTER.
SURVEYOR'S SOLAR COMPASS.
(Application filed June 14, 1901.)
(No Model.) 2 Sheets—Sheet 1.
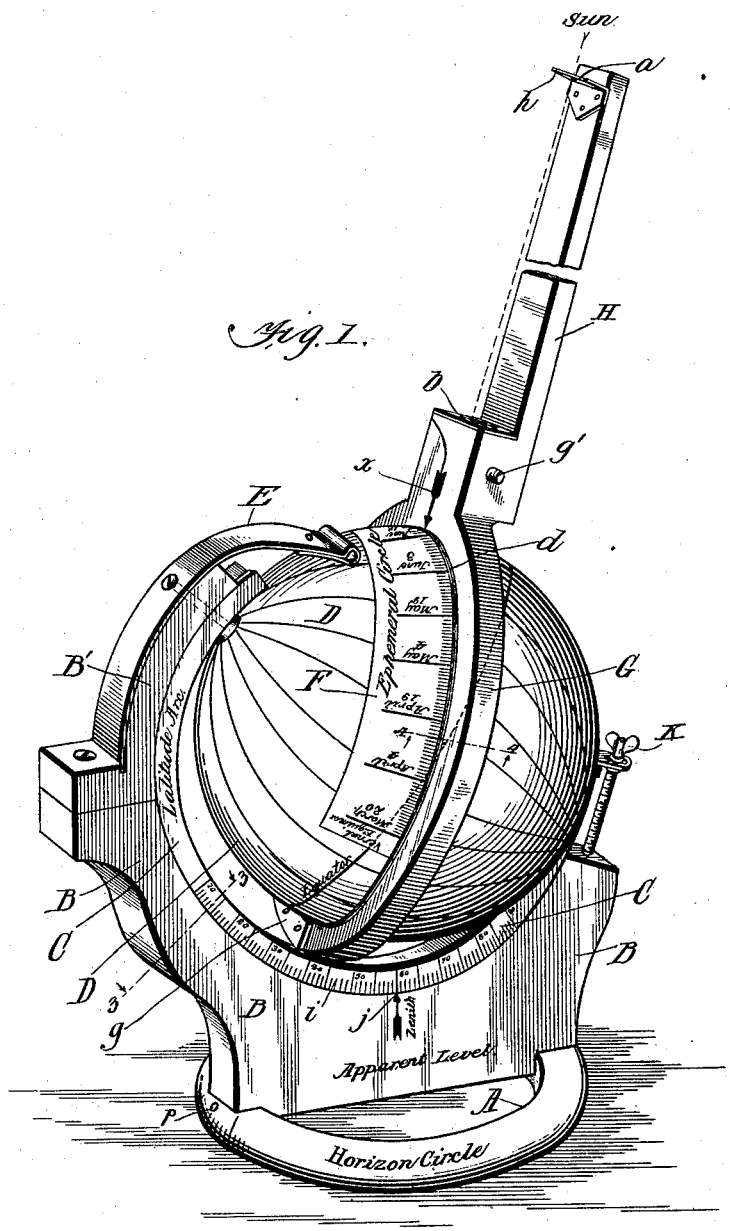
WITNESSES:
INVENTOR
Joseph B. Potter.
BY
ATTORNEYS No. 686,127. Patented Nov. 5, 1901.
J. B. POTTER.
SURVEYOR'S SOLAR COMPASS.
(Application filed June 14, 1901.)
(No Model.) 2 Sheets—Sheet 2.

WITNESSES:
Fred P. Bradford,
Edw. W. Byrn.

INVENTOR
Joseph B. Potter.
BY Munn & Co.
ATTORNEYS

UNITED STATES PATENT OFFICE.

JOSEPH B. POTTER, OF BERRYVILLE, ARKANSAS, ASSIGNOR OF ONE-HALF TO LEE H. RAWLINS, DIGBY J. WEST, DIGBY B. WEST, AND WILLIAM E. GEORGE, OF BERRYVILLE, ARKANSAS.

SURVEYOR'S SOLAR COMPASS.

SPECIFICATION forming part of Letters Patent No. 686,127, dated November 5, 1901.

Application filed June 14, 1901. Serial No. 64,543. (No model.)

*To all whom it may concern:*

Be it known that I, JOSEPH B. POTTER, of Berryville, in the county of Carroll and State of Arkansas, have invented a new and useful Improvement in Surveyors' Solar Compasses, of which the following is a specification.

The object of my invention is to provide a surveyor's compass which shall not be subject to the objections of the magnetic needle. There are two regular and systematic changes (secular and diurnal) always to be calculated and allowed for while using a magnetic needle. These separate each survey from its preceding one over the same lines, forcing a random or trial line to reëstablish the variation of the needle. Aside from these regular changes, local magnetic ore, the Northern Lights, electrical disturbances, &c., render a needle so erratic and unreliable that it is impossible to do accurate work with the same. My invention is designed to overcome these difficulties and to that end provides a compass without a magnetic needle and which establishes the north and south positions through observations taken from the sun in its relation to the earth, as will be hereinafter fully described with reference to the drawings, in which—

Figure 3:
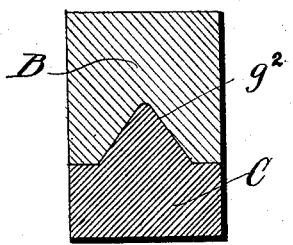
Figure 4:
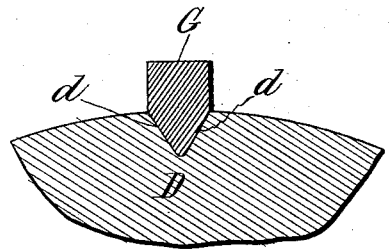
Figure 2:
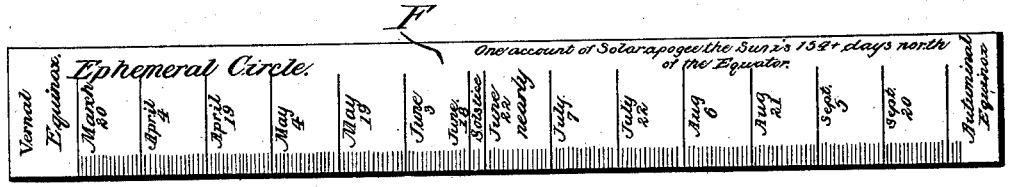
Figure 5:

Figure 1 is a perspective view of the entire instrument. Fig. 2 is the scale of the ephemeral circle as laid out for the northern hemisphere and extending from vernal to the autumnal equinox. Figs. 3 and 4 are details, and Fig. 5 is a slight modification.

I will first describe briefly the mechanical features of my improved solar compass and afterward describe them in relation to their astronomical values and functions.

A is a circular base-ring, of brass or other non-magnetic substance, and which I call the "horizon-circle." This is turned to fit the azimuth-circle of a surveyor's instrument and is to be mounted thereon or upon any similar support adapted to be leveled and turned about a vertical axis. Rigidly fixed to this horizon-circle A and occupying a vertical plane thereon in its diametrical line is a yoke B B', made of two curved sections which together extend around a little more than the semicircumference of a circle. In the inner edge of the yoke is formed a groove $g^2$, in which slides an arc-bar C, which I term the "latitude-arc." The latitude-arc slides peripherally in the groove of the yoke, for which purpose the arc-bar is formed with a tongue on its convex side fitting and sliding within the groove of the containing-yoke. This arc-bar is somewhat more than a semicircumference in length, and in it, near its ends, is carried the polar axis of a globe D, which is free to turn on said axis within the arc. A friction-spring E is affixed to the upper end of the yoke B' and is arranged to bear on the surface of the globe to hold it in any position to which it may be adjusted. Instead of the spring, however, a friction-washer might be located at the polar axis of the globe and between the globe and its arc-bar C, as is well known. To adjust the arc-bar C in its longitudinal slide within the yoke, an adjusting-screw K is tapped through a plate on the lower end of the arc-bar and is made to bear against or to swivel in the yoke. The range of adjustment of this screw should be sufficient to cover the extremes of latitude on the globe within which the instrument is designed to work.

On the globe are laid off, from the polar axis, the meridian circles of fifteen degrees, indicating the hour-angles, and across them is described the line of the equator. There is also formed on the surface of the globe a groove $d$, encircling the same, with its plane cutting the equator along the line of the ecliptic—*i. e.*, twenty-three degrees, twenty-seven minutes, ten seconds—to the equator. Then from points on the globe which represent the polar axis of the ecliptic lines are laid off on a scale F which I call the "ephemeral circle." This scale (shown in detail in Fig. 2) has a separate subdivision for each day from the "vernal to the autumnal equinox." In the groove cut in the globe is arranged a ring G, made in two sections hinged at $g$ and connected together at the opposite side by means of a set-screw $g'$. This ring is capable when the screw $g'$ is loosened of being turned or swiveled in the grooves to any position and then being fixed in that position by tightening the screw $g'$. From the ring a radial arm H extends, which I call the "declination-arm." Upon the outer end of this arm is placed a right-angular plate $h$, with a small aperture $a$ through the same, through which the sun's rays can pass, and a silver or other metal plate $b$ is fixed at right angles to the arm, close to its inner end and against a shoulder on the same. This plate $b$ is marked with cross-lines upon which will fall the sun's image when the declination-arm is pointing to the sun, the rays from the sun passing through the aperture $a$ in the plate at the outer end and falling within the cross-lines of plate $b$. When the instrument is so placed and adjusted as to permit the sun's rays to thus fall upon the cross-lines, then will the polar axis of the globe point north and south, thus determining these positions, which is the object to be attained.

I will now describe the values, functions, and adjustments of the various parts of the instrument when in use.

Supposing it is desired to find the north position at any given place upon the earth's surface, I first set the horizon-circle A upon any compass or transmit and level carefully. Then the screw $g'$ of the ring G is loosened, and a zero-point $x$ of the declination-arm H is set to the day on the ephemeral-circle scale F which corresponds to the date of the observation, and the ring and declination-arm are then clamped tightly to the globe by tightening screw $g'$, so that the globe-ring and declination-arm turn together about the polar axis of the globe. The latitude-arc C is then set in the yoke B B' to indicate the latitude of the place. This is done by a scale $i$ in relation to the zenith and nadir line $j$ of the yoke. This tilts the polar axis of the globe to bring the latitude of the place in proper relation to the sun—i. e., the latitude-arc C is adjusted to the local latitude of the observer. Then turn the whole device in azimuth about the vertical axis on the transit with one hand and turn with the other hand the declination-arm H to the hour-angle of the sun until the sun's image through the aperture $a$ falls within the cross-lines of the plate $b$. Then will the polar axis of the globe be due north and south. A zero-point P on the horizon-circle A will also read the direction of the transit-telescope from the azimuth-circle. With the horizon-circle A level and the declination set off on the ephemeral-circle scale F (the day of the year mechanically doing this) the elevation of the sun at noon will set the latitude-arc C to local latitude. The horizon-circle has a zero-point north and south in line with the polar axis of the globe, and either with or without a vernier. Instead of having simply a hole $a$ in a plate $h$ on the outer end of the declination-arm H, I may have a lens or inverting telescope, as seen in Fig. 5. In extra-fine instruments the collimating device should have tangent screws to adjust to a perfect geocentric line of collimation.

In my invention it will be seen that the sun's declination and the latitude of the place of observation are mechanically set off with great precision without the aid of a nautical almanac and without a special scientific education in astronomy and higher mathematics. Indeed, by simply setting to the day of the year on ephemeral circle the sun's declination is already set off for that day, and the highest point of the sun at noon will give the latitude of the place by simply adjusting the latitude-arc to the sun's light from apparent level. For this no observation on polaris is needed, requiring also the nautical almanac to determine the declination of polaris and higher mathematics to correct for azimuth.

In the drawings, Figs. 1 and 2, I have shown the scale of the ephemeral circle for only the northern hemisphere; but it will be understood that it is extended through the southern hemisphere for a complete year. The said ephemeral circle also has from the vernal to the autumnal equinox one hundred and eighty-six plus days on account of solar apogee—i. e., eleven days in March, thirty in April, thirty-one in May, thirty in June, thirty-one in July, thirty-one in August, and twenty-two plus in September. This subdivision can be adjusted by the manufacturer so that one hundred and seventy-nine long days shall equal one hundred and eighty-six short days in the same circle. In other words, the northern half of ephemeral circle should have one hundred and eighty-six plus subdivisions and the southern one hundred and seventy-nine only.

Having thus described my invention, what I claim as new, and desire to secure by Letters Patent, is—

1. The solar compass comprising a "horizon-circle" with yoke adapted to be adjusted about a vertical axis, a "latitude-arc" bar carrying a globe adjustable as to the polar axis in the plane of the yoke, said globe having a swiveling peripheral ring arranged in the plane of the ecliptic and an "ephemeral-circle" scale described from the polar axis of the ecliptic, and a "declination-arm" extending from the ecliptic ring and bearing collimating devices for the sun's rays substantially as described.

2. The solar compass comprising a "horizon-circle" with scale for horizontal adjustment, a yoke fixed to said circle in a vertical plane diametrically to the same, an adjustable "latitude-arc" bearing a globe axially pivoted in said arc-bar and also a latitude-scale opposite the zenith-point of the yoke, a set-screw for adjusting the "latitude-arc" in the line of its periphery, a friction-clamp for holding the globe against accidental turning on its polar axis, said globe having a peripherally-adjustable ring arranged in the plane of the ecliptic and an "ephemeral scale" described from the polar axis of the ecliptic, and a "declination-arm" extended in the plane of the ecliptic ring and bearing collimating devices for the sun's rays, substantially as described.

JOSEPH B. POTTER.

Witnesses:
J. O. COLLIER,
S. S. CUNNINGHAM.